Patented May 15, 1934

1,958,691

UNITED STATES PATENT OFFICE 1,958,691

FUEL AND PROCESS OF TREATING FUELS

Joel R. Belknap, Charleston, W. Va., assignor to Fuel Process Company, Charleston, W. Va., a corporation of West Virginia No Drawing. Application November 6, 1930, Serial No. 493,921

7 Claims. (Cl. 44—6)

This invention relates to conditioning of solid carbonaceous fuels, and more particularly such fuels subject to handling and storage in exposure to atmospheric conditions; and it is among the objects of the invention to provide an improved and highly advantageous form of treatment of this type. Other objects and advantages will appear as the description proceeds.

To the accomplishment of the foregoing and related ends, the invention, then, consists of the features hereinafter fully described, and particularly pointed out in the claims, the following description setting forth in detail certain illustrative embodiments of the invention, these being indicative however of but a few of the various ways in which the principle of the invention may be employed.

In proceeding in accordance with my invention, any of the customary fuels, for instance bituminous coal, coke, anthracite, lignite, briquettes, etc., may be treated. Where the fuel already contains a high moisture content and presents wet surfaces, I prefer to proceed by sprinkling a pulverulent or granular form material of inorganic character capable of dissolving and distributing on the wet surfaces of the fuel, and affording thence the action hereinafter more particularly referred to. If the fuel is of such dryness as not to afford moist surfaces, I may initially spray a sufficient amount of water, such as to provide for the dissolving and distributing of the granular treating agent which is then subsequently sprinkled on. Desirably, the granular treating agent is applied while the fuel is in motion, for instance while being loaded or unloaded from cars, or while being transported in a conveyor, since in such manner an adequate mixture and distribution is attained without the necessity of a specific mixing-operation as such. The pulverulent or granular treating agent, as referred to, may be a material becoming moisture-attracting in the conditions of usage, for instance a hygroscopic salt, as calcium chloride, magnesium chloride, mixtures thereof, etc. In general, with suitably moist surfaces presented by the fuel, and proper distribution and mixing, application of amounts of such chloride on the order of 10–15 pounds per ton of the fuel affords satisfactory results.

With some fuels, instead of employing calcium chloride or the like as such, I have found that better results may be had by application of a mixture of calcium chloride or the like, with a salt of chromic acid, for instance sodium chromate, sodium bichromate, etc. The salt of chromic acid having as a function the prevention of rusting of containers of the fuel, such as steel containers, should be in minor proportions, not exceeding for instance about 5 per cent. One desirable formula showing excellent results with many types of fuel, particularly certain bituminous coals, comprises calcium chloride about 45 per cent., magnesium chloride about 20 per cent., and sodium chromate 1 up to 5 per cent. Another desirable formula comprises commercial calcium chloride with about 1 per cent. of sodium bichromate. Such chlorides, whether magnesium chloride or calcium chloride, etc., may for convenience be designated as an "alkaline earth chloride." The hygroscopic agent, calcium chloride or the like, with the salt of chromic acid may be applied to the fuel in the form of a solution, being sprayed thereon. In some instances, residual brines and mother liquors running high in hygroscopic chlorides or the like may be combined with a salt of chromic acid. Where the treating agent is applied as a liquid, solutions having specific gravities of 1.1–1.4 are in general applicable. Usually a gravity of about 1.3 is desirable. Preferably, however, the hygroscopic agent and the salt of chromic acid are made up in molten admixture, and then the material is finely divided so as to be practical in solid form. Conveniently this may be accomplished by granulating or flaking. Such finely divided material can then be available for application as such at the point of usage, as indicated above.

Other modes of applying the principle of the invention may be employed, change being made as regards the details described, provided the features stated in any of the following claims, or the equivalent of such, be employed.

I therefore particularly point out and distinctly claim as my invention:—

1. A fuel prepared for allaying of dust and preventing disintegration thereof and rusting of steel containers thereby comprising, solid carbonaceous fuel treated with a mixture of a major portion of alkaline earth chloride and a minor portion of a salt of chromic acid.

2. A fuel prepared for allaying of dust and preventing disintegration thereof and rusting of steel containers thereby, comprising a solid carbonaceous fuel treated with a mixture of a major proportion of calcium chloride and a minor proportion of a salt of chromic acid.

3. A fuel prepared for allaying of dust and preventing disintegration thereof and rusting of steel containers thereby comprising, solid carbonaceous fuel treated with a mixture of major portions of calcium and magnesium chlorides and a minor portion of a salt of chromic acid.

4. A fuel prepared for laying of dust and preventing disintegration thereof and rusting of steel containers thereby, comprising solid carbonaceous fuel treated with a mixture of a major portion of a moisture-attracting alkaline earth chloride and a minor portion of a salt of chromic acid.

5. A fuel prepared for allaying of dust and preventing disintegration thereof and rusting of steel containers thereby comprising. solid carbonaceous fuel treated with a mixture of a major portion of alkaline earth chloride protective against fuel-oxidative atmospheric effect, and a minor portion of a salt of chromic acid.

6. The process of treating solid carbonaceous fuel for allaying dust and preventing disintegration of the fuel and rusting of steel containers thereby, which comprises subjecting the fuel in the presence of water to the action of a hygroscopic inorganic alkaline earth chloride combined with a small percentage of a rust preventing salt of chromic acid.

7. The process of treating solid carbonaceous fuel for laying dust and preventing disintegration of the fuel and rusting of steel containers thereby, which comprises applying in solid form a major portion of a granular moisture-attracting alkaline earth chloride and a minor portion of a salt of chromic acid.

JOEL R. BELKNAP.